(12) United States Patent
Chiang et al.

(10) Patent No.: US 9,078,157 B2
(45) Date of Patent: Jul. 7, 2015

(54) QUICK RECOVERY OF RF SESSIONS AFTER BACKHAUL LINK FAILURE

(71) Applicants: Verizon Patent and Licensing, Arlington, VA (US); Cellco Partnership, Arlington, VA (US)

(72) Inventors: David Chiang, Fremont, CA (US); Steven R. Rados, Danville, CA (US); Donna L. Polehn, Kirkland, WA (US); Thomas W. Haynes, San Ramon, CA (US); Sagiv Draznin, Walnut Creek, CA (US); Patricia R. Chang, San Ramon, CA (US); Lalit R. Kotecha, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 188 days.

(21) Appl. No.: 13/731,404

(22) Filed: Dec. 31, 2012

(65) Prior Publication Data
US 2014/0187236 A1 Jul. 3, 2014

(51) Int. Cl.
H04W 24/04 (2009.01)
(52) U.S. Cl.
CPC .................................. *H04W 24/04* (2013.01)
(58) Field of Classification Search
USPC .................................. 455/423, 422, 436, 450
See application file for complete search history.

(56) References Cited

U.S. PATENT DOCUMENTS

| | | | |
|---|---|---|---|
| 6,269,402 B1* | 7/2001 | Lin et al. | 709/227 |
| 6,477,373 B1* | 11/2002 | Rappaport et al. | 455/436 |
| 2005/0102529 A1* | 5/2005 | Buddhikot et al. | 713/200 |
| 2006/0069934 A1* | 3/2006 | Esch et al. | 713/300 |
| 2008/0056121 A1* | 3/2008 | Tsai et al. | 370/216 |
| 2008/0056424 A1* | 3/2008 | Chang et al. | 375/371 |
| 2008/0250301 A1* | 10/2008 | Mukhopadhyay et al. | 714/786 |
| 2009/0133099 A1* | 5/2009 | Varadarajan et al. | 726/2 |
| 2009/0213730 A1* | 8/2009 | Zeng et al. | 370/217 |
| 2010/0265818 A1* | 10/2010 | Chen et al. | 370/217 |
| 2011/0026928 A1* | 2/2011 | Stango et al. | 398/83 |
| 2011/0287772 A1* | 11/2011 | Park et al. | 455/450 |
| 2011/0294492 A1* | 12/2011 | Hsu et al. | 455/422.1 |
| 2011/0317544 A1* | 12/2011 | Chou | 370/216 |
| 2012/0225655 A1* | 9/2012 | Son et al. | 455/436 |
| 2012/0314567 A1* | 12/2012 | Seo et al. | 370/228 |
| 2013/0051216 A1* | 2/2013 | Bisdikian et al. | 370/217 |
| 2014/0038582 A1* | 2/2014 | Horneman et al. | 455/418 |
| 2014/0047002 A1* | 2/2014 | Plant | 709/203 |

* cited by examiner

*Primary Examiner* — Jinsong Hu
*Assistant Examiner* — Jean Chang

(57) ABSTRACT

Communication sessions with mobile devices may be suspended, in a wireless communications network, after failure of one or more backhaul network links In one implementation, a device may detect failure of a backhaul network connecting a cell site to a core portion of a wireless network; and suspend, based on the detected failure, communication sessions with mobile devices connected to the cell site through radio interfaces, the suspending of the communication sessions including preventing loss of the communication sessions despite the failure of the backhaul network. The device may further detect cessation of the failure of the backhaul network; and resume, based on the detected cessation of the failure of the backhaul network, the communication sessions with the mobile devices.

20 Claims, 9 Drawing Sheets

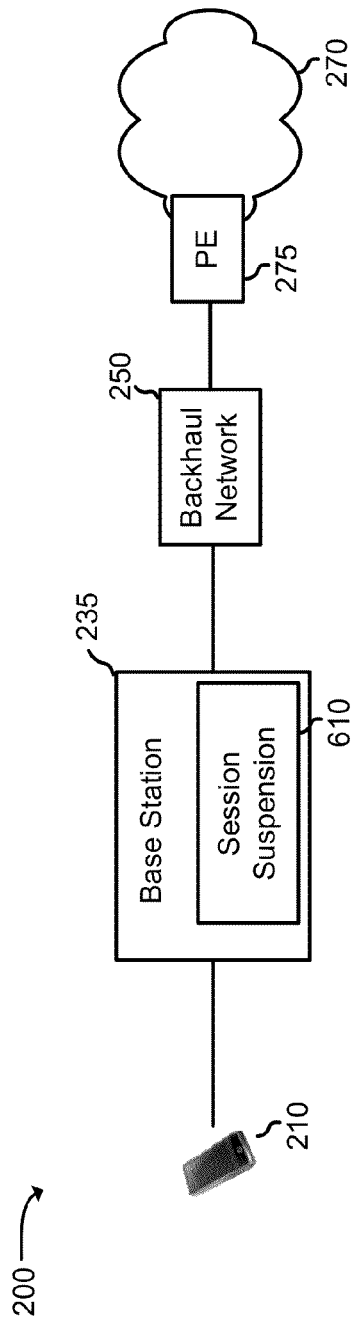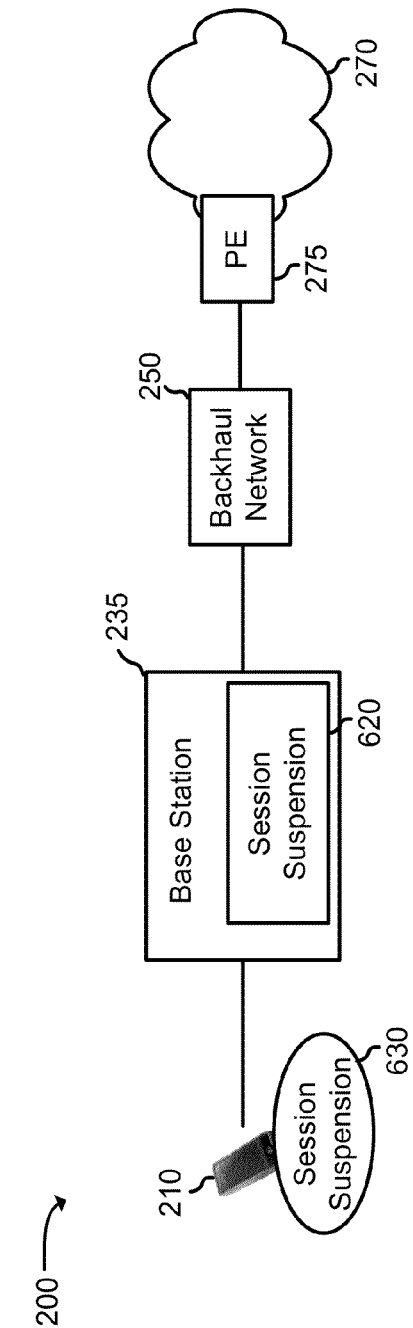

QUICK RECOVERY OF RF SESSIONS AFTER BACKHAUL LINK FAILURE

BACKGROUND

A wireless communications network may include a radio network distributed over a geographical area, divided into sub-geographical areas called cells, where each cell may be served by at least one transceiver. The transceiver may be referred to as a cell site or base station. In aggregate, the cells may provide radio coverage over a wide geographic area. A mobile device, during use (e.g., during a telephone call or data session), may move through one or more cells in a manner that is generally transparent to the user of the mobile device.

Cells in a wireless communications network may be differentiated based on a size of the area they serve and/or based on the equipment used to implement a cell. In contrast to a macrocell, small cells (such as picocells and femtocells) may include lower powered radio access nodes that operate in the license and/or unlicensed radio spectrum. With the increasing popularity of mobile network usage, such as mobile usage relating to mobile data traffic, small cells are becoming an increasingly important element of wireless networks.

BRIEF DESCRIPTION OF THE DRAWINGS

FIG. 6A is a diagram illustrating an example of another implementation of portions of the environment of the FIG. 2 that may be used to implement the flow chart of FIG. 4;

FIG. 6B is a diagram illustrating an example of another implementation of portions of the environment of FIG. 2 that may be used to implement the flow chart of FIG. 4;

DETAILED DESCRIPTION OF PREFERRED EMBODIMENTS

The following detailed description refers to the accompanying drawings. The same reference numbers in different drawings may identify the same or similar elements.

Techniques described herein may provide for the temporary suspension of radio frequency (RF) sessions, in a wireless communications network, after failure of one or more upstream portions of the wireless telecommunications network. For example, in response to the failure of a backhaul network between a cell and a core portion of the wireless communications network, base stations associated with the cell may communicate with mobile devices, connected to the cell, to suspend the RF sessions with the mobile devices. "Suspending" a session, as used herein, may broadly refer to techniques that act to prevent the loss of network connectivity with the mobile devices. For example, suspending an RF session may include transmitting an explicit message to mobile devices to indicate that the mobile devices are to pause communications and/or to techniques that are transparent to the mobile devices, such as techniques based on responding to or buffering communications from the mobile devices in a way that minimizes or eliminates the chances of termination of communication sessions. Advantageously, when the failure in the backhaul network is resolved, the mobile devices can resume normal communications without having to waste time and/or network resources to reestablish a network connection.

Figure 1:
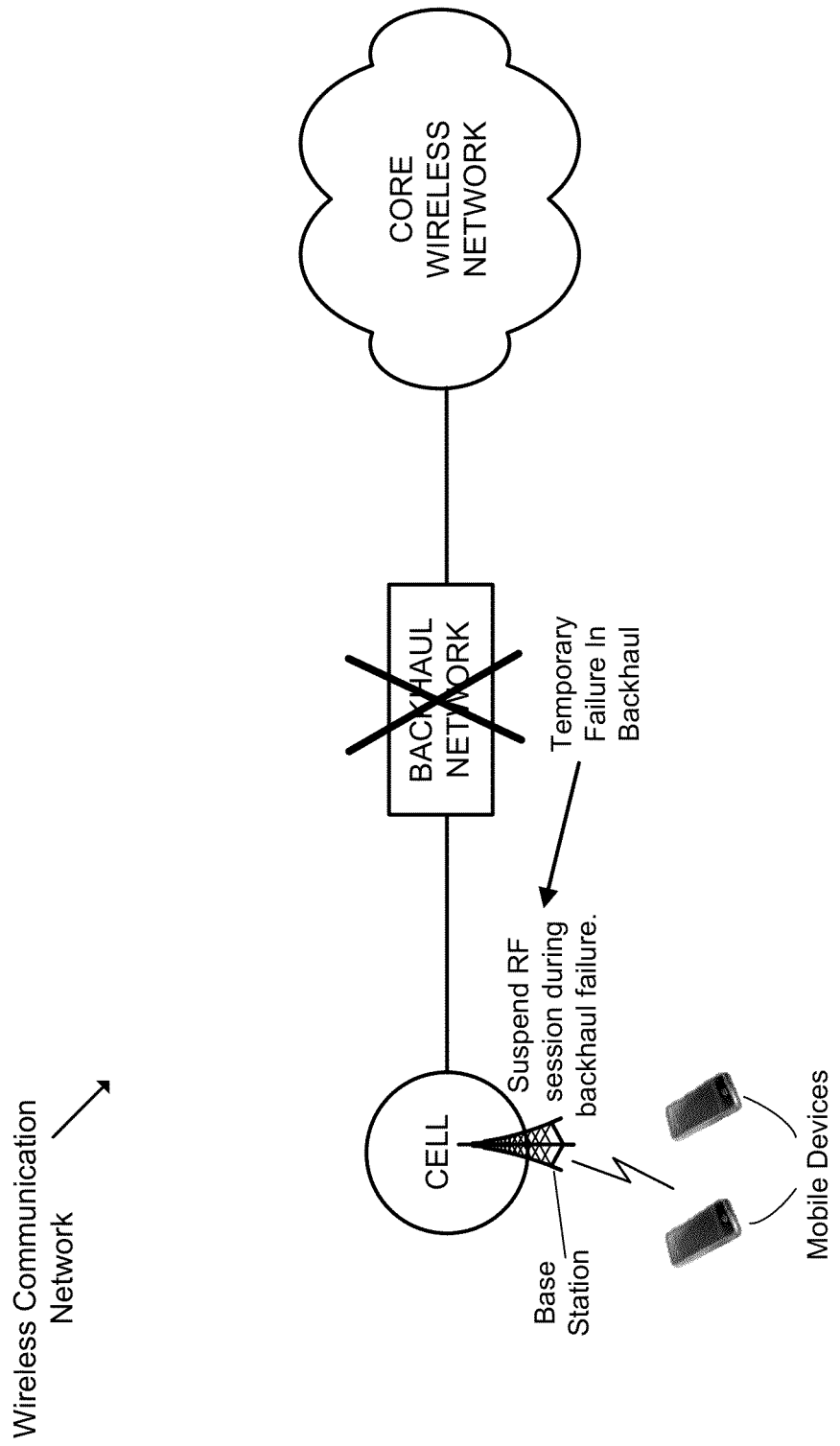
FIG. 1 is a diagram conceptually illustrating an example of an overview of concepts described herein.

FIG. 1 is a diagram conceptually illustrating an example of an overview of concepts described herein. As shown in FIG. 1, mobile devices, in a wireless communications network, may connect to a base station at a cell in the wireless communications network. The cell may communicate, through a backhaul network, with a core portion of the wireless network ("core wireless network"). The cell may be, for example, a small cell. Small cells may be characterized by a generally less robust operating environment than macrocells. For example, the backhaul network link connecting the small cell to the core wireless network may tend to be less robust than a backhaul network link that is used to connect a macrocell to the core wireless network.

As illustrated in FIG. 1, the backhaul network link may temporarily fail. For example, one or more devices in the backhaul network may experience a failure due to a power spike, a power interruption, or hardware and/or software issues. Consistent with aspects described herein, the cell may detect the failure of the backhaul network. For example, a watchdog timer at the cell, such as a software- or hardware-implemented watchdog timer, may detect the failure of the backhaul network. The cell may then take action to suspend RF sessions with the attached mobile devices such that the mobile devices will not disconnect from the cell due to the failure of the backhaul network. For example, the cell may transmit an explicit message (e.g., a "suspend session" message) to suspend the RF sessions and/or may use techniques that are transparent to the mobile devices to suspend the RF sessions. At some point, the failing backhaul network may begin to operate normally. The suspended RF sessions may then continue to function as normal. Suspending the RF sessions with the mobile devices, as described herein, may be particularly effective at suspending sessions for relatively short periods of time (e.g., 500 ms to 3 seconds) due to failure of the backhaul network due to temporary glitches/errors, such as a temporary power failure.

Figure 2:
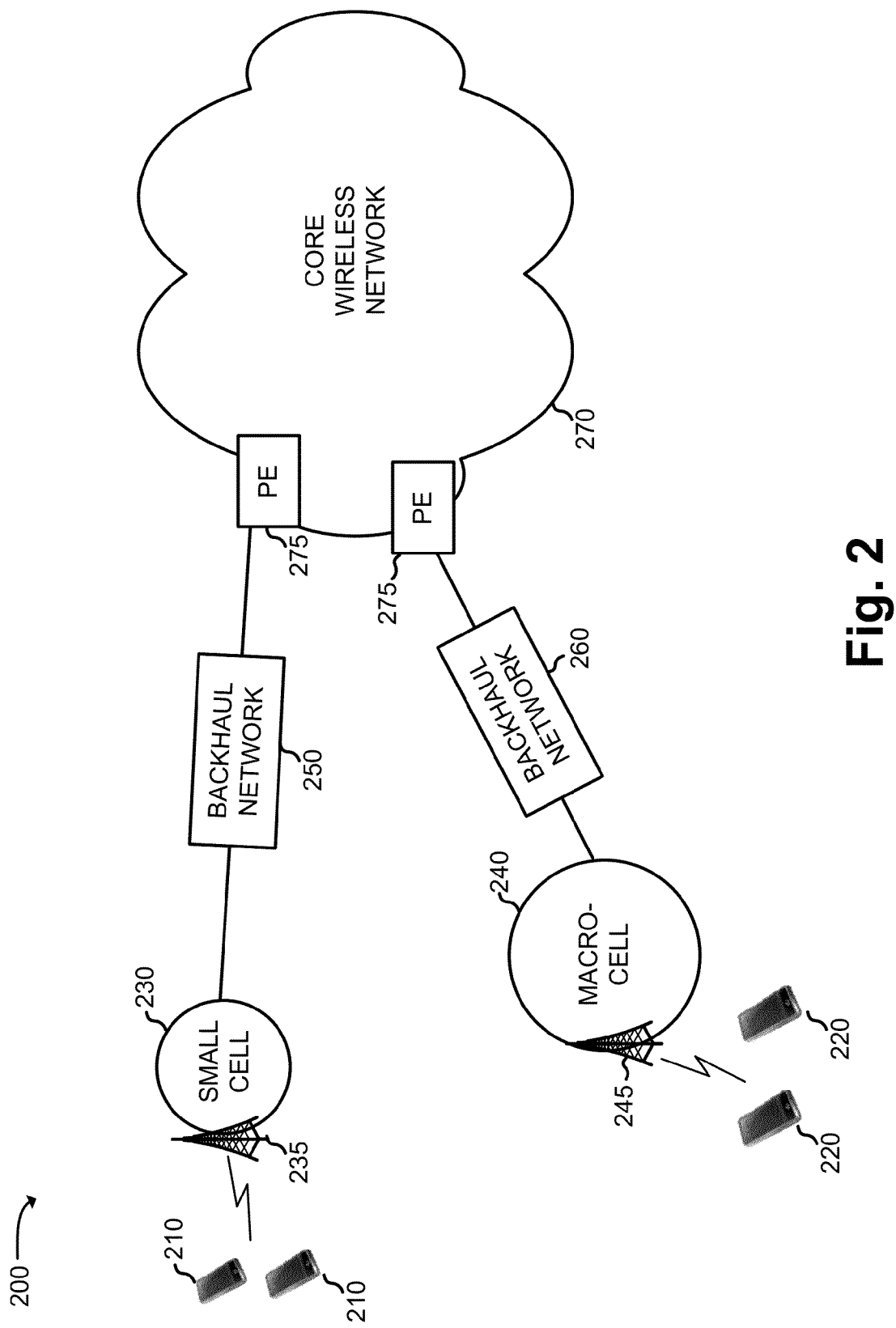
FIG. 2 is a diagram of an example environment in which systems and/or methods described herein may be implemented.

FIG. 2 is a diagram of an example environment 200 in which systems and/or methods described herein may be implemented. Environment 200 may implement a wireless communications network, such as a long term evolution (LTE) based network or another wireless communications network. Environment 200 may include mobile devices 210 and 220. As illustrated, mobile devices 210 may connect to a first cell, which may include small cell 230, and mobile devices 220 may connect to a second cell, which may include macrocell 240. Small cell 230 may connect, via backhaul network 250, to core wireless network 270. Similarly, macrocell 240 may connect, via backhaul network 260, to core wireless network 270.

As previously mentioned, in contrast to a macrocell, small cells, such as small cell 230, may include lower powered radio access nodes that operate in the licensed and/or unlicensed radio spectrum. In one implementation, small cell 230 may include one or more base stations 235 and one or more networking devices, such as a router or other network devices, that connect to backhaul network 250. Base station 235 may include a powered traditional wireless base station, such as, in the context of an LTE network, an Evolved Node B (eNodeB) that includes one or more radio antenna and transceivers that operate in a licensed wireless spectrum. Alternatively, base stations 235 may include other types of transceivers, such as radio transceivers that operate in an unlicensed spectrum, such as a Wi-Fi-based transceiver.

Macrocell 240 may include one or more base stations, labeled as base station 245 (e.g., an eNodeB). Each base station 245 may provide a radio interface with which the base station may communicate with mobile devices 220. For example, each base station 245 may include one or more antennas and transceiver circuitry (e.g., radio modems) related to the interfacing and driving of the radio interface.

Backhaul networks 250 and 260 may each include one or more networking devices, such as routers or switches, and links, such as fiber or coaxial links, that connect respective base stations 235/245 to core wireless network 270. In general, backhaul network 260 may be implemented in a more robust manner than backhaul network 250. For example, backhaul network 260 may include higher capacity network devices and links that include relatively high-quality power sources and backup power sources. In contrast to backhaul network 260, backhaul network 250 may be less robustly implemented and more susceptible to failures, such as temporary failures due to power loss, equipment failures, or congestion.

Core wireless network 270 may include one or more networks of any type, such as a local area network (LAN), a wide area network (WAN), and/or a metropolitan area network (MAN). In one implementation, core wireless network 270 may implement an LTE network. In this situation, core wireless network 270 may be implemented using a flat, IP-based network architecture that includes one or more network devices or components that facilitate the providing of network access to mobile devices 210 and 220. Core wireless network 270 may connect to one or more other networks, such as a packet data network (PDN) (e.g., the Internet) to provide network service to mobile devices 210 and 220. Core wireless network 270 may additionally include one or more provider edge (PE) routers 275, which may each act to connect cells 230/240, through backhaul networks, such as backhaul networks 250 and 260. One example implementation of core wireless network 270 is illustrated in more detail in FIG. 3.

Figure 3:
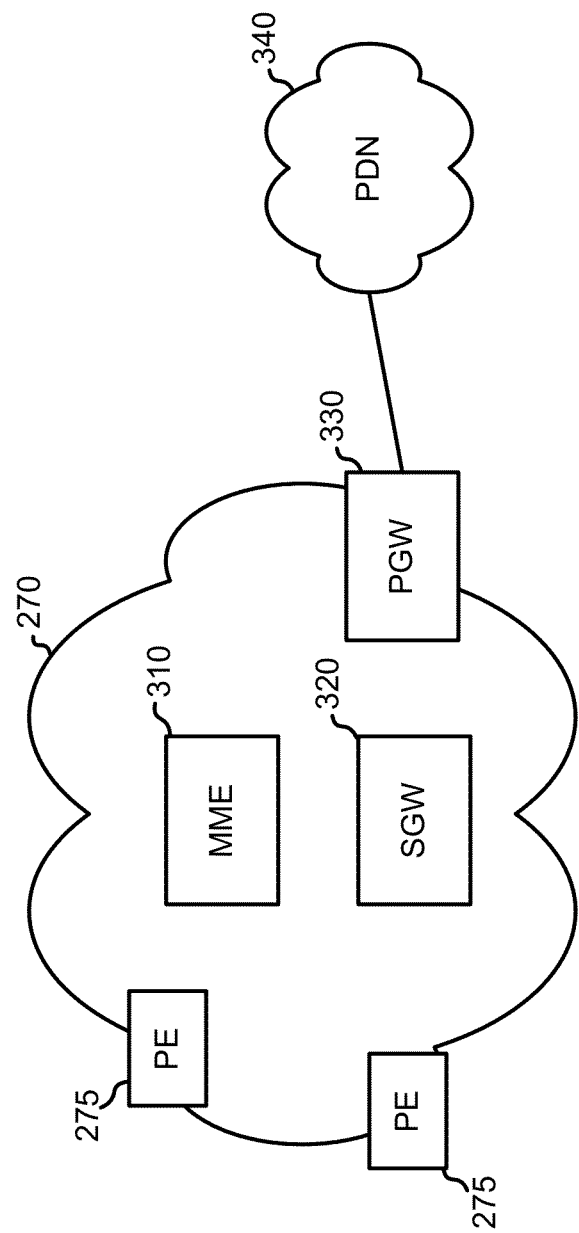
FIG. 3 is a diagram illustrating components of one example of a wireless network.

FIG. 3 is a diagram illustrating components of one example of core wireless network 270. In the example of FIG. 3, core wireless network 270 may be implemented as an LTE network. In other implementations, other technologies may be used to implement core wireless network 270.

As illustrated, core wireless network 270 may include a mobility management entity (MME) 310, a serving gateway (SGW) 320, and a packet data network gateway (PGW) 330. MME 310 may, for example, include one or more computation and communication devices that are responsible for authenticating mobile devices, maintaining location information for mobile devices, and selecting a packet gateway to service a particular mobile device (such as a gateway to another network). SGW 320 may include one or more computation and communication devices that route and forward user data packets. SGW 320 may also act as a mobility anchor during inter-base station handoffs. PGW 330 may provide connectivity from mobile devices to external PDNs, such as PDN 340. PGW 330 may provide connectivity from mobile devices to a PDN by being the point of exit and entry of traffic for mobile devices. PGW 330 may perform policy enforcement, packet filtering, and charging support. PDN 340 may include one or more packet networks, such as an Internet Protocol (IP) based packet network. PDN 340 may include a wide area network (WAN), a local area network (LAN), and/or combinations of WANs and LANs. Mobile devices may access PDN 340, through PGW 330, to obtain computation and/or data services from computing devices, such as servers, connected to PDN 340.

Although FIGS. 2 and 3 illustrate example components of environment 200, in other implementations, environment 200 may contain fewer components, different components, differently arranged components, or additional components than those depicted in environment 200. Alternatively, or additionally, one or more components of environment 200 may perform one or more other tasks described as being performed by one or more other components of environment 200.

Figure 4:
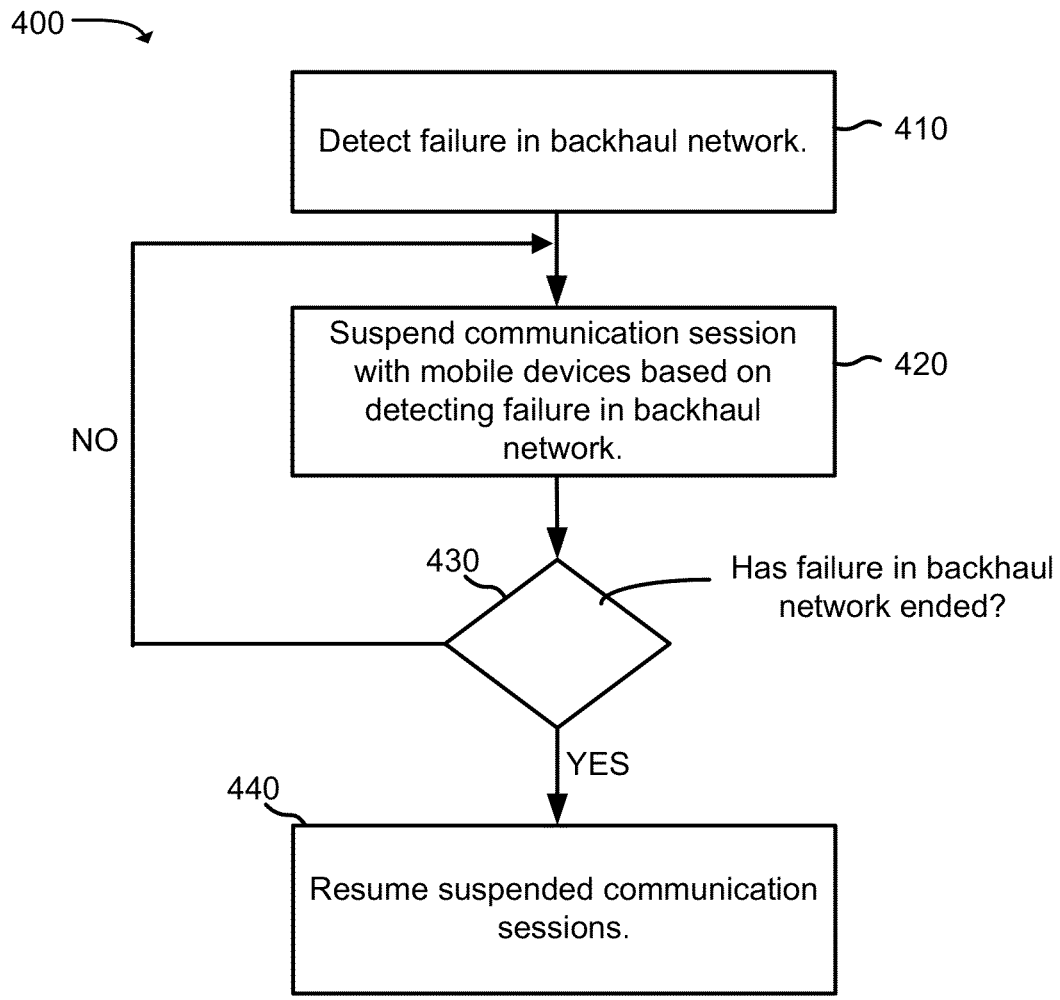
FIG. 4 is a flow chart illustrating an example process for suspending RF sessions.

FIG. 4 is a flow chart illustrating an example process 400 for suspending RF sessions. Process 400 may be implemented, for example, by one or more of devices in environment 200, such as mobile devices 210/220, base station 235, base station 245, or other devices associated with a cell.

As illustrated in FIG. 4, process 400 may include detecting a failure in the backhaul network (block 410). For example, base station 235 may detect failures in backhaul network 250. The detected failures may include power failures, equipment failures, or other failures that cause a link between small cell 230 and core wireless network 270 to become unusable. In other possible implementations, other devices, such as a router or other network device, connected to base station 235, may detect the failure in backhaul network 250.

A number of techniques may potentially be used to detect failure in the backhaul network. For example, a hardware- or software-implemented timer (e.g., a watchdog timer) may be associated with a predetermined interval (e.g., 100 ms), over which the timer may be reset based on a heartbeat message or other indication that the backhaul network is active. Failure of the watchdog timer to detect activity by the expiration of the predetermined interval may indicate a failure in the backhaul network. In some implementations, the indication of the failure of the backhaul network may be based on an absence of one or more types of signals or messages over the predetermined interval. Additionally or alternatively, failure in the backhaul network may be detected using other techniques. For example, a circuit designed to sense power, such as a circuit implemented in base station 235 or backhaul network 250, may directly detect the occurrence of a power failure, and may correspondingly signal base station 235.

Process 400 may further include, when failure has been detected in the backhaul network, suspending the communication session with the mobile devices (block 420). For example, base station 235 may suspend the communication session with each of the mobile devices 210 that are attached to base station 235. As previously mentioned, suspending a communication session may broadly refer to techniques that act to prevent the loss of network connectivity and/or prevent the loss of communication sessions with mobile devices 210 despite the failure of the backhaul network. For example, suspending the session may include transmitting an explicit message to mobile devices 210 to indicate that mobile devices 210 are to enter a pause or idle state. In some implementations, base station 235 may also enter an idle or pause state. In other possible implementations, suspending the communication session may include using techniques that are transparent to mobile devices 210. For example, base station 235 may buffer messages or packets during the failure. As another example, base station 235 may generate dummy communications (e.g., messages or signals) designed to cause mobile devices 210 to keep communication sessions open.

Process 400 may further include determining when the failure in the backhaul network ends (block 430). In one implementation, the cessation of the failure in the backhaul network may be determined when activity is detected in the backhaul network. For example, a watchdog timer, incremented by the base station 235, may detect activity in backhaul network 250. As another example, a circuit designed to detect the loss of power may detect the resumption of power.

Process 400 may further include, when the failure in the backhaul network ends (block 430—YES), resuming the suspended communication sessions (block 440). For example, in situations in which base station 235 transmits an explicit message to mobile devices 210 to indicate that mobile devices 210 are to enter a pause or idle state, base station 235 may transmit a another message to mobile devices 210 to indicate that the mobile devices are to resume normal operation. In situations in which base station 235 suspends the communication sessions of mobile devices 210 via techniques that are transparent to mobile devices 210, base station 235 may cease to act to suspend the communication sessions.

Referring back to block 430, base station 235 may continue to suspend communication sessions with the mobile devices as long as failure in the backhaul network continues (block 430—NO). In some implementations, the suspension of the communication sessions may be limited to a maximum suspend period. For example, when a failure in the backhaul network is detected, but the failure continues beyond a predetermined interval (e.g., 4 seconds), base station 235 may stop the suspension of the communication session (e.g., the communication session may be allowed to terminate).

Figure 5A:
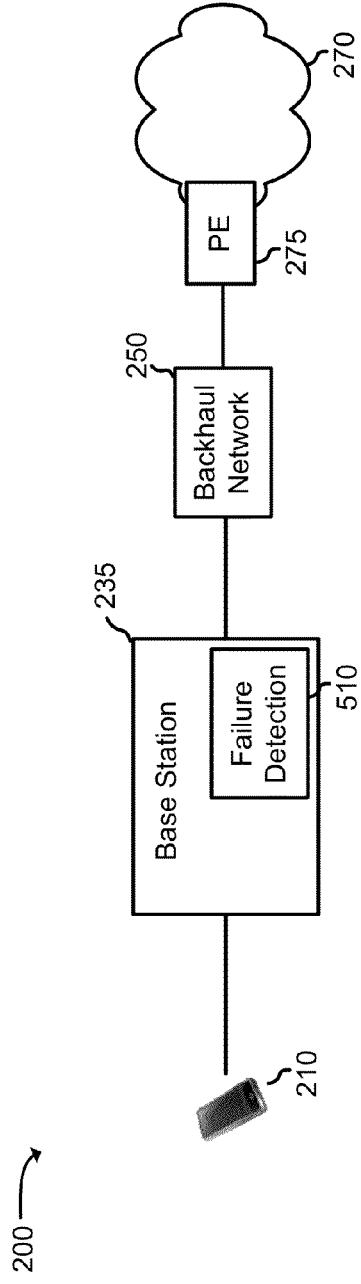
FIG. 5A is a diagram illustrating an example of one implementation of portions of the environment of FIG. 2 that may be used to implement the flow chart of FIG. 4.

FIG. 5A is a diagram illustrating an example of one implementation of portions of environment 200 that may be used to implement the flow chart of FIG. 4. In FIG. 5A, components to detect failure in the backhaul network (block 410) may be particularly illustrated.

As illustrated, in this implementation, base station 235 may include failure detection component 510. Failure detection component 510 may include logic, such as logic implemented in software or hardware, to detect upstream link failures (i.e., link failures in the direction of backhaul network 250). As mentioned, the detected failures may include failures due to power outages, equipment failures, or other failures that cause a link between base station 235 and core wireless network 270 to become unusable.

Figure 5B:
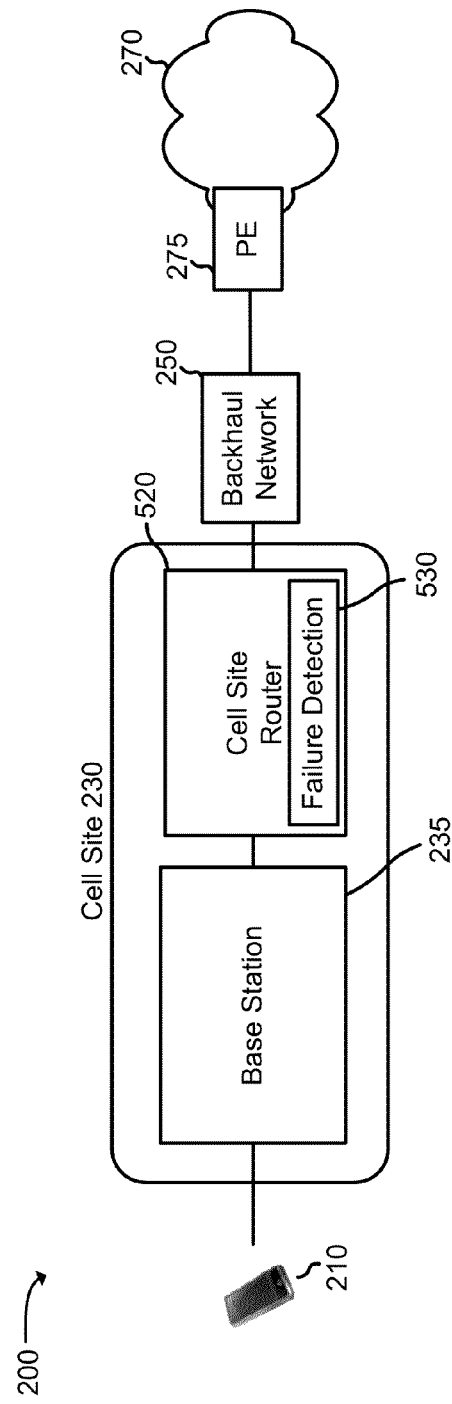
FIG. 5B is a diagram illustrating an example of another implementation of portions of the environment of the FIG. 2 that may be used to implement the flow chart of FIG. 4.

FIG. 5B is a diagram illustrating an example of another implementation of portions of environment 200 that may be used to implement the flow chart of FIG. 4. In FIG. 5B, components to detect failure in the backhaul network (block 410) may be particularly illustrated. In FIG. 5B, base station 235 is illustrated as communicating with core wireless network 270 through a cell site router 520.

Cell site router 520 may include one or more devices to perform routing and switching services in environment 200. Cell site router 520 may route data packets between base station 235 and backhaul network 250. Cell site router 520 may include failure detection component 530, which may include, for example, logic to detect link failures in backhaul network 250. In one implementation, failure detection component 530 may be implemented as an alarm or trigger that is programmed into cell site router 520. Upon detection of a failure, failure detection component 530 may, for example, transmit a message, indicating the failure, to base station 235.

FIG. 6A is a diagram illustrating an example of one implementation of portions of environment 200 that may be used to implement the flow chart of FIG. 4. In FIG. 6A, components to suspend the communication session (block 420) may be particularly illustrated.

As illustrated, in this implementation, base station 235 may include session suspension component 610. Session suspension component 610 may operate to suspend communication sessions, such as RF communication sessions, with mobile devices 210. In this implementation, session suspension component 610 may operate transparently to the operation of mobile device 210 (e.g., mobile device 210 may not necessarily include logic to explicitly implement a session suspension). For example, session suspension component 510 may buffer messages or packets received during the failure of backhaul network 250. As another example, session suspension component 610 may generate dummy communications (e.g., messages or signals) designed to cause mobile devices 210 to keep sessions that are open as active sessions. As another example, session suspension component 610 may hold or otherwise reserve resources beyond a period in which the resources would normally be held or reserved. As another example, session suspension component 610 may extend normal thresholds that may be associated with timers that are used to timeout or terminate a session. In some implementations, session suspension component 610 may operate to extend sessions for up to a maximum threshold time period (e.g., two seconds). After the threshold time period expires, session suspension component 610 may allow the communication sessions with mobile devices 210 to terminate.

FIG. 6B is a diagram illustrating an example of another implementation of portions of environment 200 that may be used to implement the flow chart of FIG. 4. In FIG. 6B, components to suspend the communication session (block 420) may be particularly illustrated.

As illustrated, in this implementation, base station 235 may include session suspension component 620 and mobile device 210 may include session suspension component 630. Session suspension component 620 and session suspension component 630 may be designed to operate together to suspend communication sessions with mobile devices 210. In one implementation, session suspension component 620 may transmit an explicit message to session suspension component 630 to indicate that a pause state or idle state is to be entered in which mobile device 210 may refrain from terminating an unresponsive communication session. For example, in response to a message from session suspension component 620, session suspension component 630 may temporarily change, or cause mobile device 210 to change, session timeout values at mobile device 210. Alternatively or additionally, session suspension component 630 may take additional actions to keep a session from terminating. In some implementations, session suspension component 630 may operate to extend sessions for up to a maximum threshold time period (e.g., two seconds).

In the above description, failure detection in the backhaul network, and the corresponding communication session suspension, was described as being performed in the radio interface side of the backhaul network. In some implementations, link failure detection and communication session suspension may also be performed by one or more devices in core wireless network 270.

Figure 7:
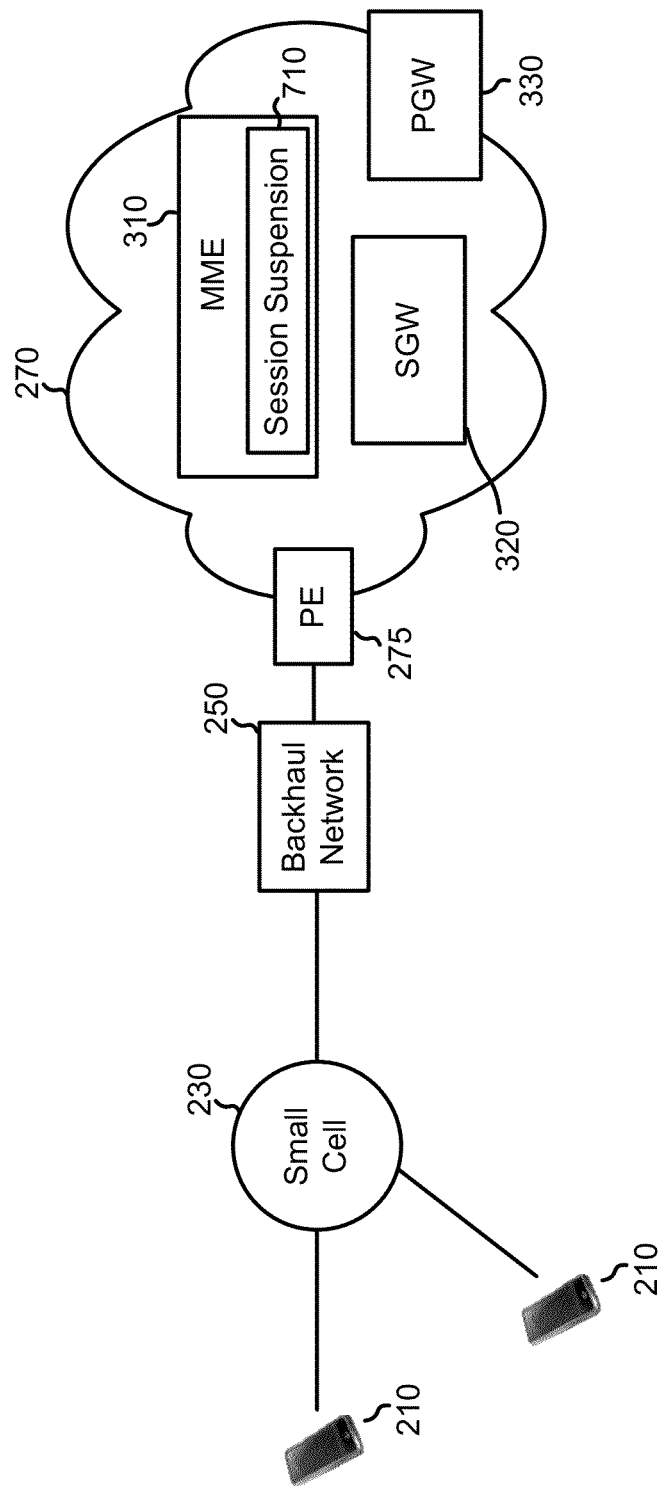
FIG. 7 is a diagram illustrating an example of an implementation in which communication sessions may be monitored at a wireless network.

FIG. 7 is a diagram illustrating an example of an implementation in which communication sessions may be monitored at core wireless network 270. In this implementation, one or more devices in core wireless network 270, such as MME 310, may monitor backhaul network 250 and/or suspend communication sessions, in core wireless network 270, in response to failures in backhaul network 250.

As illustrated, MME 310 may include a session suspension component 710. Session suspension component 710 may operate similarly to session suspension component 610/620. For example, a provider edge (PE) router 275 may detect a failure in backhaul network 250. Provider edge router 275 may notify session suspension component 710, at MME 310, of the failure in backhaul network 250. In response, session suspension component 710, as will be described in more detail below, may operate to cause communication sessions to not terminate during the failure of backhaul network 250. For example, session suspension component 710 may hold or otherwise reserve resources, in MME 310, beyond a period in which the resources would normally be held or reserved during a link failure. As another example, session suspension component 710 may extend normal thresholds that may be associated with timers, at MME 310, that are used to timeout or terminate a session. In some implementations, session suspension component 710 may operate to extend sessions for up to a maximum threshold time period (e.g., two seconds).

Although session suspension component 710 is illustrated in MME 310, in other implementations, session suspension component 710 may be implemented in other devices in core wireless network 270. Alternatively or additionally, session suspension component 710 may communicate with or otherwise control other devices in core wireless network 270, such as SGW 320 or PGW 330, to suspend the communication sessions.

Figure 8:
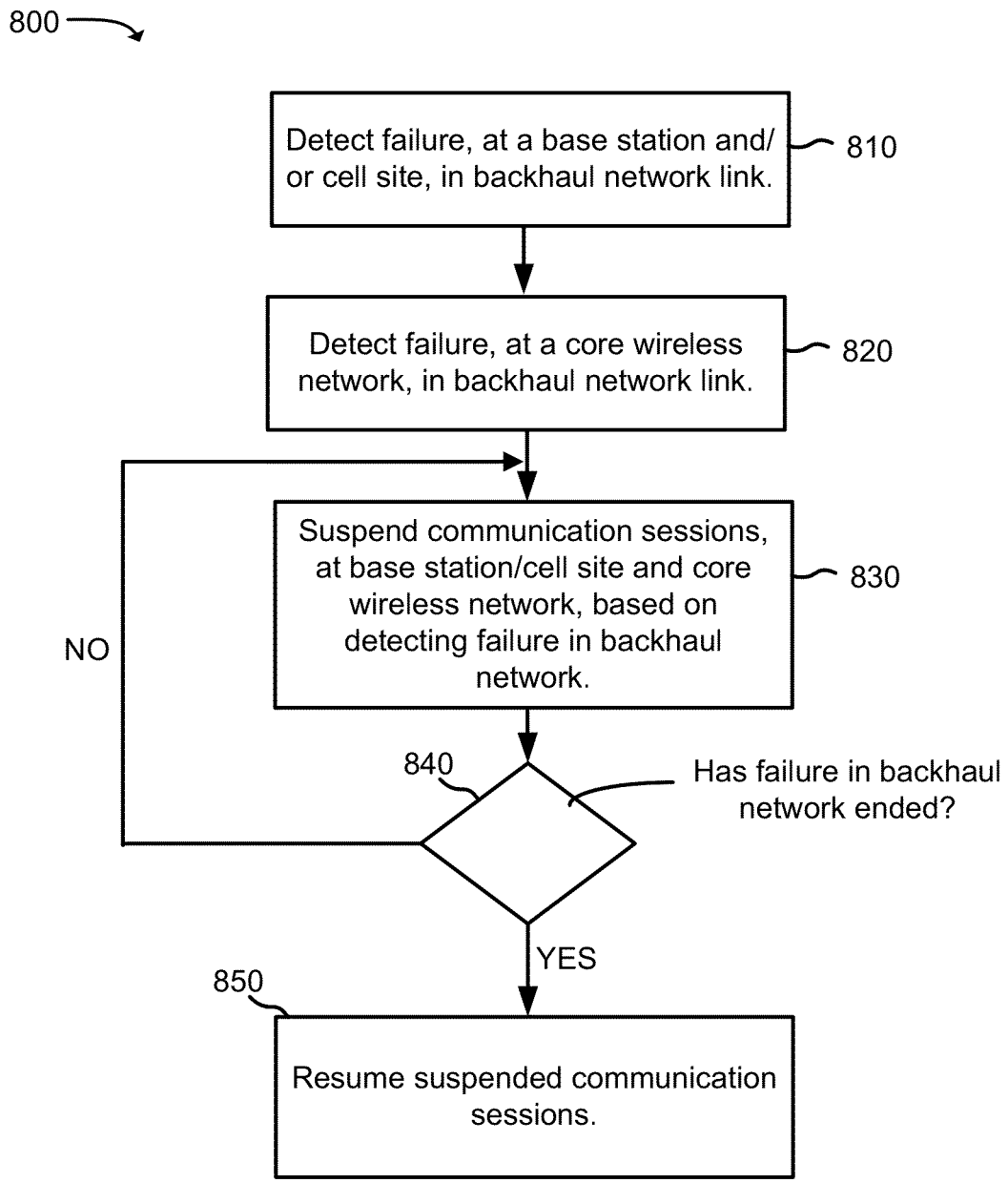
FIG. 8 is a flow chart illustrating an example process for suspending RF sessions.

FIG. 8 is a flow chart illustrating an example process 800 for suspending RF sessions when a failure in a backhaul network is detected at a base station and/or cell site, as well as at a core wireless network. Process 800 may be implemented, for example, by one or more of devices in environment 200, such as mobile devices 210/220, base station 235, base station 245, PE 275, MME 310, SGW 320, and/or PGW 330.

Process 800 may include detecting a failure, at a base station and/or at a cell site, in the backhaul network (block 810). For example, as previously discussed, base station 235 and/or another device (e.g., cell site router 530) may detect failures in backhaul network 250. A number of techniques may potentially be used to detect failure in the backhaul network. For example, a hardware- or software-implemented timer (e.g., a watchdog timer) may be associated with a predetermined interval (e.g., 100 ms), by which the timer may be reset based on a heartbeat message, or other indication that the backhaul network is active. Failure of the watchdog timer to detect activity, in the backhaul network, by the expiration of the predetermined interval, may indicate a failure in the backhaul network.

Process 800 may include detecting a failure, at a device in core wireless network 270, in the backhaul network (block 820). For example, as previously discussed, provider edge router 275, or another device, may detect a failure in backhaul network 250. Provider edge router 275 may notify one or more devices in core wireless network 270, such as MME 310.

Process 800 may further include, when failure has been detected in the backhaul network, suspending the communication sessions (block 830). The communication sessions, associated with mobile devices 210, may be suspended in both directions from backhaul network 250 (e.g., a downstream direction associated with a cell site 230 and an upstream direction associated with core wireless network 270). As previously discussed, a number of techniques may be used to suspend the communication sessions associated with mobile devices 210. For example, base station 235 may suspend the communication session with each of the mobile devices 210 that are attached to base station 235. Similarly, one or more devices in core wireless network, such as MME 310 (or another device), may act to suspend the communication sessions within the core wireless network.

Process 800 may further include determining when the failure in the backhaul network ends (block 840). In one implementation, failure in the backhaul network may be determined to end when activity is detected in the backhaul network. The end of the failure in the backhaul network may be detected at both base station 235 and provider edge router 275.

Process 800 may further include, when the failure in the backhaul network ends (block 840—YES), resuming the suspended communication sessions (block 850). For example, in situations in which base station 235 transmits an explicit message to mobile devices 210 to indicate that mobile devices 210 are to enter a pause or idle state, base station 235 may transmit a another message to mobile devices 210 to indicate that the mobile devices are to resume normal operation. Similarly, devices in core wireless network 270, such as MME 310, may resume normal operation.

Figure 9:
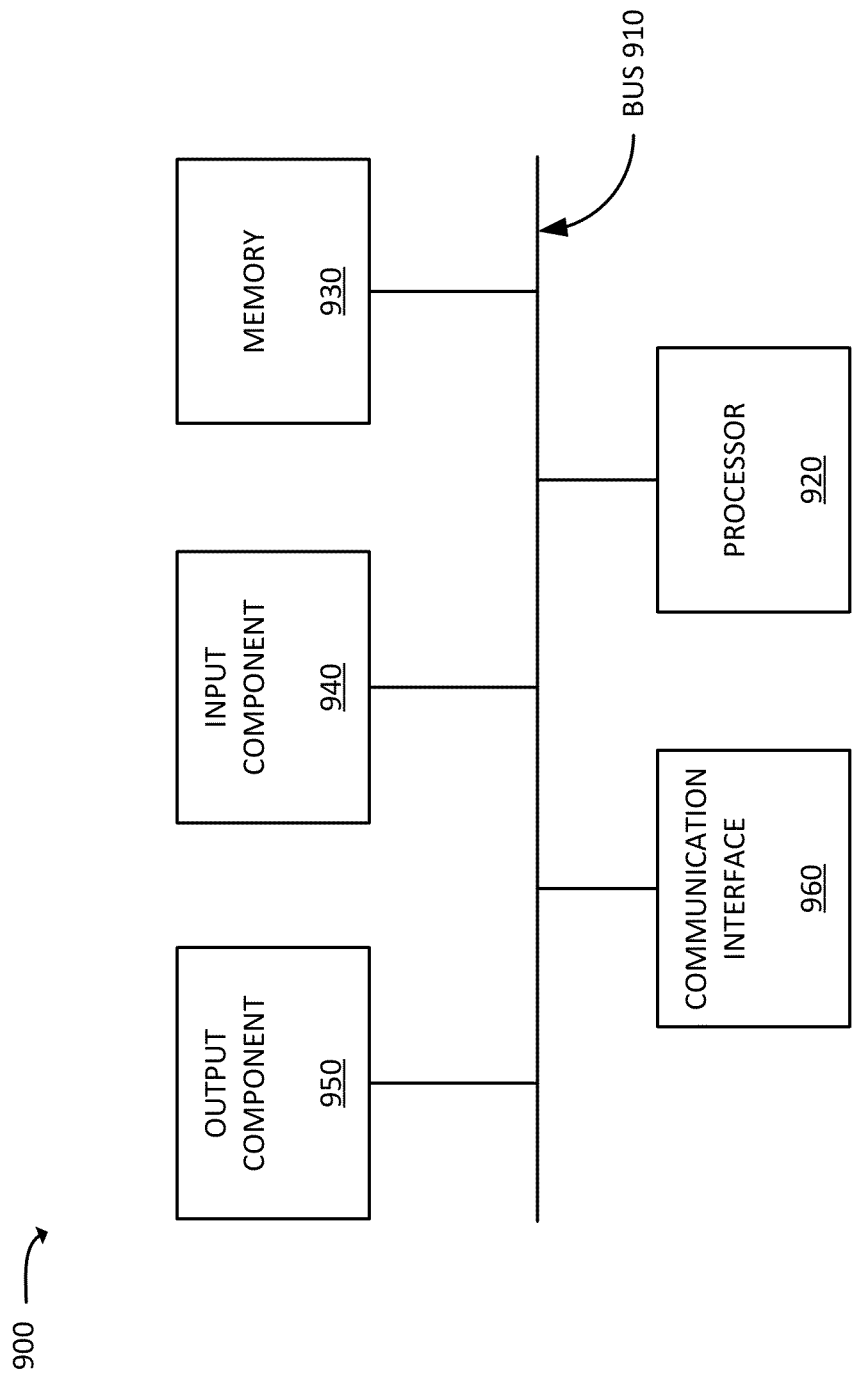
FIG. 9 is a diagram of example components of a device.

FIG. 9 is a diagram of example components of a device 900. Each of the devices illustrated in FIGS. 1-3 and 5-7 may include one or more devices 900. Device 900 may include bus 910, processor 920, memory 930, input component 940, output component 950, and communication interface 960. In another implementation, device 900 may include additional, fewer, different, or differently arranged components. Some non-limiting examples of device 900, with additional and/or different components, are discussed below.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIGS. 4 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
   detecting, by one or more devices, failure of a backhaul network connecting a cell site to a core portion of a wireless network;
   suspending, by the one or more devices and based on the detected failure, a communication session with a mobile device connected to the cell site through radio interfaces, the suspending of the communication session including preventing loss of the communication session despite the failure of the backhaul network;
   detecting, by the one or more devices, cessation of the failure of the backhaul network; and
   resuming, by the one or more devices and based on the detected cessation of the failure of the backhaul network, the communication sessions with the mobile devices.

2. The method of claim 1, wherein suspending the communication session further comprises:
   transmitting one or more messages to the mobile device to cause the mobile devices to enter a pause state with respect to the communication sessions.

3. The method of claim 1, wherein suspending the communication sessions further comprises one or more of:
   buffering messages or packets received during the failure of the backhaul network;
   reserving resources beyond a period in which the resources would be reserved for normal operation when there is no failure of the backhaul network; or
   extending thresholds associated with one or more timers used to terminate communication sessions.

4. The method of claim 1, further comprising:
   ceasing the suspension of the communication sessions when the failure of the backhaul network continues for at least a threshold time period.

5. The method of claim 1, wherein detecting the failure of the backhaul network further comprises:
   maintaining a watchdog timer to detect activity in the backhaul network; and
   indicating detection of the failure of the backhaul network when the watchdog timer does not detect activity in the backhaul network for more than a predetermined time interval.

6. The method of claim 1, wherein detecting the failure of the backhaul network further comprises:
   detecting a power failure in the backhaul network; and
   outputting an indication of the detected power failure.

7. The method of claim 1, wherein the one or more devices include a base station in a cellular wireless network.

8. The method of claim 7, wherein the one or more devices include a cell site router and wherein the detection of the failure of the backhaul network is performed by the cell site router.

9. A device comprising:
   a memory; and
   at least one processor to execute instructions in the memory to:
      detect failure of a backhaul network connecting a cell site to a core portion of a wireless network;
      suspend, based on the detected failure, communication sessions with mobile devices connected to the cell site through radio interfaces, the suspending of the communication sessions including preventing loss of the communication sessions despite the failure of the backhaul network;
      detect cessation of the failure of the backhaul network; and
      resume, based on the detected cessation of the failure of the backhaul network, the communication sessions with the mobile devices.

10. The device of claim 9, wherein the at least one processor, when suspending the communication sessions, is further to execute the instructions in the memory to:
    transmit one or more messages to the mobile devices to cause the mobile devices to enter a pause state with respect to the communication sessions.

11. The device of claim 9, wherein the at least one processor, when suspending the communication sessions, is further to execute the instructions in the memory to:
    buffer messages or packets received during the failure of the backhaul network;
    reserve resources beyond a period in which the resources would be reserved for normal operation when there is no failure of the backhaul network; or
    extend thresholds associated with one or more timers used to terminate communication sessions.

12. The device of claim 9, wherein the at least one processor is further to execute the instructions in the memory to:

cease the suspension of the communication sessions when the failure of the backhaul network continues for at least a threshold time period.

13. The device of claim 9, wherein the at least one processor, when detecting the failure of the backhaul network, is further to:
maintain a watchdog timer to detect activity in the backhaul network; and
indicate detection of the failure of the backhaul network when the watchdog timer does not detect activity the backhaul network for more than a predetermined time interval.

14. The device of claim 9, wherein the at least one processor, when detecting the failure of the backhaul network, is further to:
detect a power failure in the backhaul network; and
output an indication of the detected power failure.

15. A system comprising:
a cell site in a wireless network, the cell site coupled to a backhaul network and the cell site including:
a failure detection component to detect a failure in the backhaul network, and
a session suspension component to suspend, based on the detected failure in the backhaul network, communication sessions with mobile devices that are connected to the cell site in the wireless network; and
a core portion of the wireless network, the core portion of the wireless network being coupled to the backhaul network and the core portion of the wireless network including:
logic to detect the failure in the backhaul network; and
logic to suspend, based on the detected failure in the backhaul network, communication sessions in the core portion of the wireless network that are associated with the mobile devices.

16. The system of claim 15, wherein the session suspension component, in the cell site, is further to detect cessation of the failure of the backhaul network; and resume, based on the detected cessation of the failure of the backhaul network, the suspended communication sessions with the mobile devices.

17. The system of claim 15, wherein the logic to suspend, in the core portion of the wireless network, is further to detect cessation of the failure of the backhaul network; and resume, based on the detected cessation of the failure of the backhaul network, the suspended communication sessions.

18. The system of claim 15, wherein the cell site includes a small cell in a wireless cellular network.

19. The system of claim 15, wherein the session suspension component, in the cell site, is further to transmit one or more messages to the mobile devices to cause the mobile devices to enter a pause state with respect to the communication sessions.

20. The system of claim 15, wherein the session suspension component, in the cell site, is further to:
buffer messages or packets received during the failure of the backhaul network;
reserve resources beyond a period in which the resources would be reserved for normal operation when there is no failure of the backhaul network; or
extend thresholds associated with one or more timers used to terminate communication sessions.

* * * * *